United States Patent
Nakamori et al.

(10) Patent No.: US 9,960,391 B2
(45) Date of Patent: May 1, 2018

(54) SEAL STRUCTURE OF BATTERY PACK

(71) Applicant: MITSUBISHI JIDOSHA KOGYO KABUSHIKI KAISHA, Tokyo (JP)

(72) Inventors: Yoji Nakamori, Gamagori (JP); Takashi Takada, Anjo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/211,026

(22) Filed: Jul. 15, 2016

(65) Prior Publication Data

US 2017/0018745 A1    Jan. 19, 2017

(30) Foreign Application Priority Data

Jul. 17, 2015  (JP) .................................. 2015-143015

(51) Int. Cl.
*H01M 2/10*    (2006.01)
*H01M 2/04*    (2006.01)

(52) U.S. Cl.
CPC ......... *H01M 2/043* (2013.01); *H01M 2/1072* (2013.01); *H01M 2/1077* (2013.01); *H01M 2220/20* (2013.01)

(58) Field of Classification Search
None
See application file for complete search history.

(56) References Cited

U.S. PATENT DOCUMENTS

2012/0115000 A1    5/2012 Hashimura et al.
2012/0164500 A1*   6/2012 Loo .................... H01M 2/1229
                                              429/82

FOREIGN PATENT DOCUMENTS

EP    2 432 047 A1    3/2012
EP    2 525 426 A1    11/2012
JP    2011-23230 A    2/2011

OTHER PUBLICATIONS

Extended European Search Report dated Dec. 2, 2016 in the corresponding European Application No. 16179611.5.

* cited by examiner

*Primary Examiner* — Wojciech Haske
(74) *Attorney, Agent, or Firm* — Birch Stewart Kolasch & Birch, LLP

(57) ABSTRACT

A seal structure of a battery pack includes a tray for storing a battery cell therein, a cover covering the tray, and a gasket pressure contacted with a seal surface of the tray and a seal surface of the cover so as to close a clearance between the seal surfaces. The gasket is held at a position different from positions of the seal surfaces.

6 Claims, 6 Drawing Sheets

SEAL STRUCTURE OF BATTERY PACK

BACKGROUND

The invention relates to a seat structure of a battery pack for a vehicle.

Conventionally, there is known a battery pack provided in a vehicle such as an electric car and a hybrid car for driving the vehicle. The battery pack is constructed such that a tray with battery cells stored therein is covered by a cover, and is arranged below a seat to be occupied by an occupant, that is, just above the bottom surface of the vehicle. Since the battery pack is susceptible to water, in order to prevent water droplets and the like jumped up from a road from invading into the interior of the tray, there is interposed between the tray and cover a gasket for preventing invasion of the water droplets.

In the above battery pack, when the tray and cover are assembled while they are displaced in position in the horizontal direction, a clearance is produced between the tray and cover, thereby raising a problem that sealing performance by the gasket can be lowered. Thus, there is known a technology relating to a seal structure of the battery pack which, even when the seal surfaces of the tray and cover are displaced in position in the horizontal direction, can make it hard for their respective seal surfaces to produce a clearance between them to thereby maintain high seal performance (see, for example, the patent document 1).

[Patent Document 1] JP 2011-23230 A

SUMMARY

The invention provides a seal structure of a battery pack which can dispense with formation of a gasket mounting hole while preventing or suppressing cost-up, and can enhance the strength of adhesion of the gasket to the tray and cover to thereby enhance waterproofness.

According to the beneficial aspect of the invention, there is provided seal structure of a battery pack, comprising:
- a tray for storing a battery cell therein;
- a cover covering the tray; and
- a gasket pressure contacted with a seal surface of the tray and a seal surface of the cover, so as to close a clearance between the seal surfaces,
- wherein the gasket is held at a position different from positions of the seal surfaces.

The seal structure may further include a flange part for holding the gasket, which is formed integrally with the tray or cover.

The seal structure may further include a clip connecting the gasket and flange part to each other.

The gasket may also be held at a position existing within the battery pack more inward than pressure contact portions of the gasket with the seal surfaces.

The gasket may also include a leg part contacting one of the seal surfaces and a hollow wall part defining a space therein and contacting the other of the seal surfaces.

A displacement amount of the hollow wall part may be larger than a displacement amount of the leg part in a state that the gasket is pressure contacted with the seal surfaces.

The seal structure may further be constructed such that the leg part is pressure contacted with one of the seal surfaces of the tray and cover which holds the gasket, and the hollow wall part is pressure contacted with the other of the seal surfaces different from the one of the seal surfaces.

DETAILED DESCRIPTION OF EXEMPLIFIED EMBODIMENTS

While the above conventional technology does not disclose a structure for fixing a gasket to a tray or a cover, normally, for fixing the gasket, it is necessary to form a gasket mounting hole in the cover or tray. Formation of such hole makes it hard to coat the periphery of the hole, thereby raising a problem that rust is generated from the periphery of the hole. This problem may preferably be solved while preventing or suppressing cost-up.

The invention aims at solving the above problem and thus has an object to provide a seal structure of a battery pack which can dispense with a gasket mounting hole while preventing or suppressing cost-up, and thus can enhance the strength of adhesion of a gasket to a tray and a cover to thereby enhance waterproofness.

Figure 1:
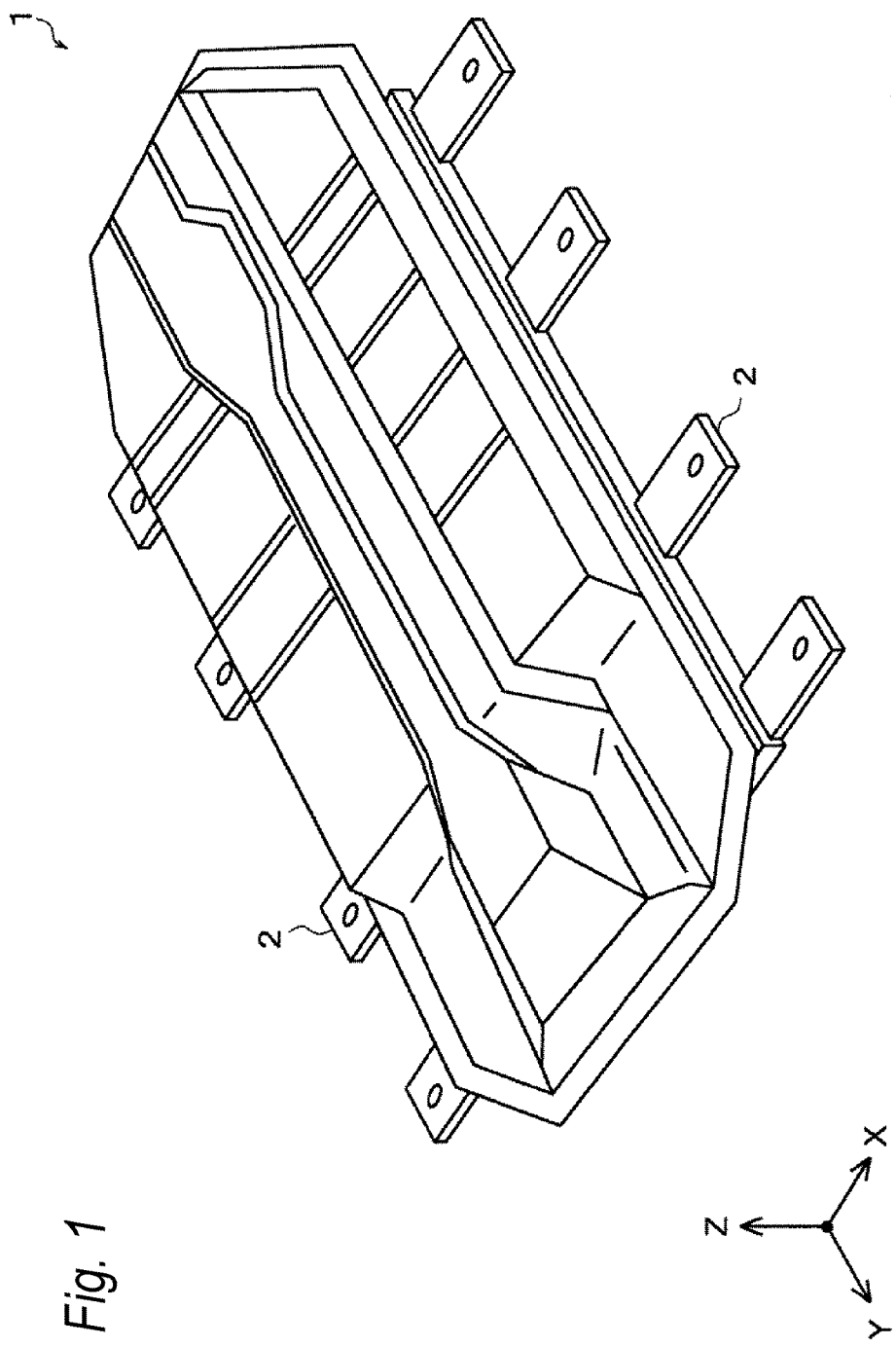
FIG. 1 is a schematic perspective view of a battery pack capable of employing an embodiment of the invention.
Figure 2:
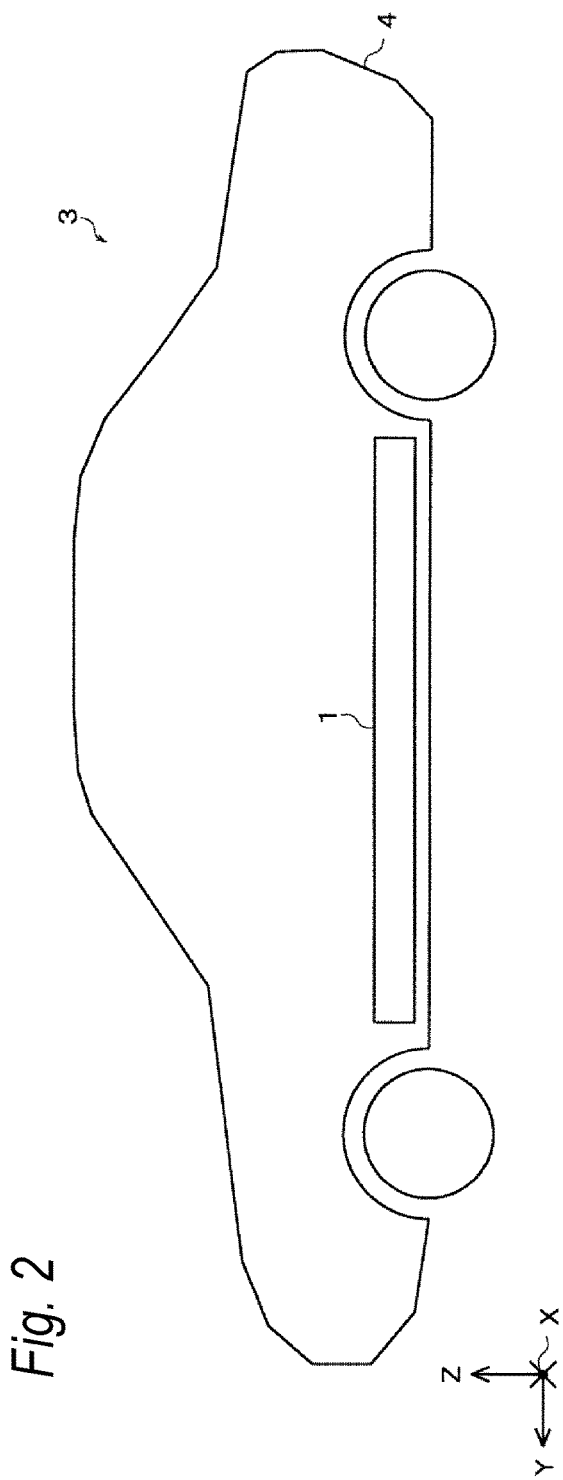
FIG. 2 is a schematic side view of a vehicle to explain a battery pack employing the embodiment of the invention.

FIG. 1 shows a battery pack employing an embodiment of the invention. In this drawing, the arrow X shows the transverse direction of a vehicle 3 shown in FIG. 2 and including a battery pack 1, the arrow Y shows the longitudinal direction of the vehicle, and the arrow Z shows the height direction of the vehicle 3, respectively. Here, the directions shown by these arrows are similar in the other drawings. The battery pack 1 stores therein battery cells (not shown) used to drive the vehicle. In the two side portions of the battery pack 1 in the X direction, there are arranged multiple mounting parts 2 for vehicle fixation. In this embodiment, eight mounting parts 2 are arranged. The battery pack 1, as shown in FIG. 2, is arranged on the bottom part of a vehicle body 4 of the vehicle 3. The battery pack 1 is fastened to the floor side member (not shown) of the vehicle 3 by a bolt (not shown) and is thereby fixed to the vehicle body 4.

Figure 3:
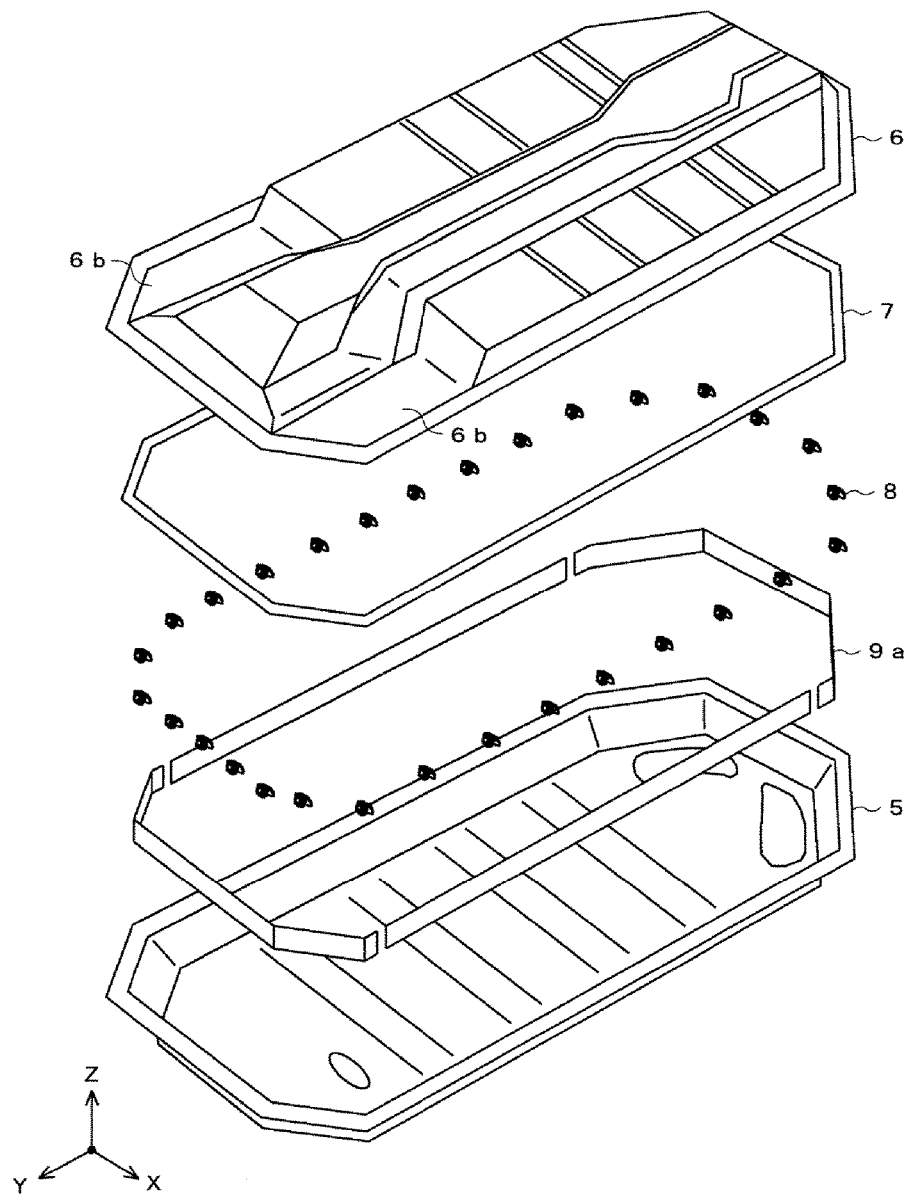
FIG. 3 is an exploded perspective view to explain the battery pack employing the embodiment of the invention.
Figure 4:
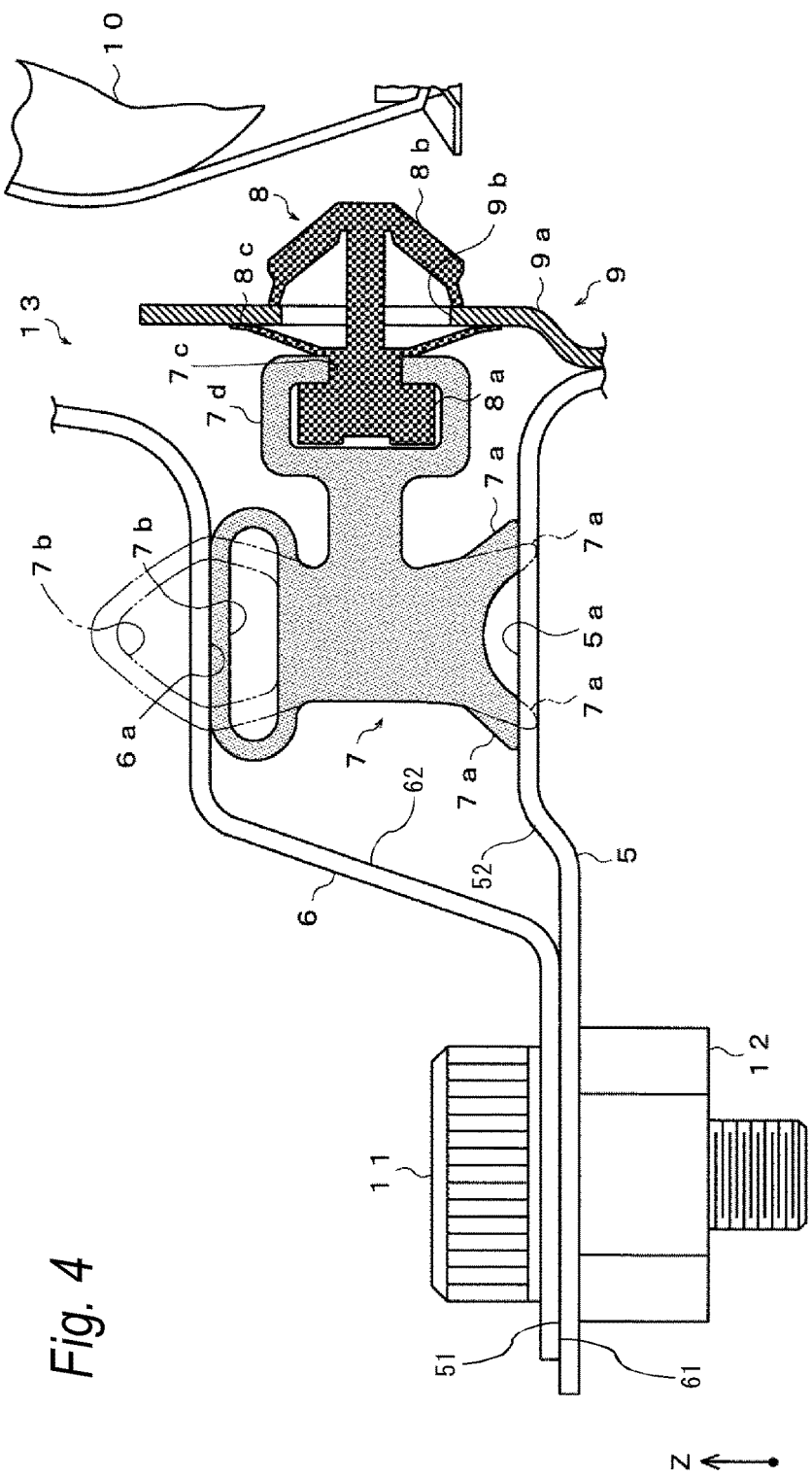
FIG. 4 is a schematic section view to explain a battery pack seal structure of the embodiment of the invention.

The battery pack 1, as shown in FIG. 3, is arranged in the lowest portion in the Z direction. The battery pack 1 includes a seal structure 13. This seal structure 13 includes: a tray 5 for storing therein battery cells (not shown); a cover 6 for covering the tray 5; an annular gasket 7 interposed between the tray 5 and cover 6 for preventing invasion of water droplets or the like into the battery pack 1; multiple clips 8 for holding the gasket 7; multiple flanges 9a constituting a flange part 8 for fixing the clips 8; and, other parts. The tray 5 and cover 6 are formed by press molding a thin iron plate. On the Y-direction front side of the cover 6, there are formed recessed parts 6b in two locations situated on the X-direction two sides which are shaped along a center console and, when the battery pack 1 is mounted on the vehicle body 4, are used to secure a space for the legs of an occupant. As shown in FIG. 4, a fastened surface 51 of the tray 5 and a fastened surface of the cover 6 are fastened by the bolt 11 and the nut 12, so that the cover 6 is attached to the tray 5. A seal surface 5a of the tray 5 and a seal surface 6a of the cover 6, on which the gasket 7 closely contacts, are formed at inner side of the battery pack 1 more than the fastened surfaces 51, 62. The seal surfaces 5a, 6a are respectively disposed at positions being higher than the fastened surfaces 51, 62 in the Z-direction. The tray 5 is formed with an inclined surface 52 connecting the seal surface 5a and the fastened surface 51. The cover 6 is formed with an inclined surface 62 connecting the seal surface 6a and the fastened surface 61. An angle of the inclined surface 62 of the cover 6 is larger than an angle of the inclined surface 52 of the tray 5. By placing the seal surfaces 5a, 6a at positions higher than the fastened surfaces 51, 61, the waterproofness of the battery pack 1 can be enhanced. Further, by making the position of the seal surface 5a different from the position of the fastened surface 51 in the Z-direction, occurrence of corrugation on the seal surface 5a in the press-forming process of the tray 5 can be suppressed, so that the forming accuracy of the seal surface 5a is improved. In addition, the tray 5 may be formed such that the inclined surface 52 is not formed and the seal surface 5a is positioned at same height as the fastened surface 51 in the Z-direction, while the seal surface 6a of the cover 6 is positioned higher than the fastened surface 61 in the Z-direction. Even in the case that the seal surface 5a is positioned at same height as the fastened surface 51 in the Z-direction, the waterproofness of the battery pack 1 can be enhanced.

The gasket 7 is made of rubber such as EPDM (Ethylene Propylene Diene Monomer rubber) used for a normal gasket. As shown in FIG. 4, the gasket 7 includes forked-section leg parts 7a on the tray 5 side thereof to be installed before the cover 6 is assembled to the tray 5, and hollow wall parts 7b on the cover 6 side thereof to be compressed when the cover 6 is assembled to the tray 5. That is, in this embodiment, the gasket 7 includes the leg parts 7a on the seal surface 5a side of the tray 5 that exists on one side thereof where the gasket 7 is held, and the hollow wall parts 7b on the seal surface 6a side of the cover 6 that exists on the other side of the gasket. Each hollow wall part 7b defines a space therein. On such side of the gasket 7 as is different from the side thereof corresponding to the seal surfaces 5a, 6a, that is, in the XY direction thereof, there is formed a hollow part to be held 7d having multiple holes 7c formed at 100~200 mm pitches. In FIG. 4, reference numeral 10 designates a harness stored in the tray 5.

Figure 5:
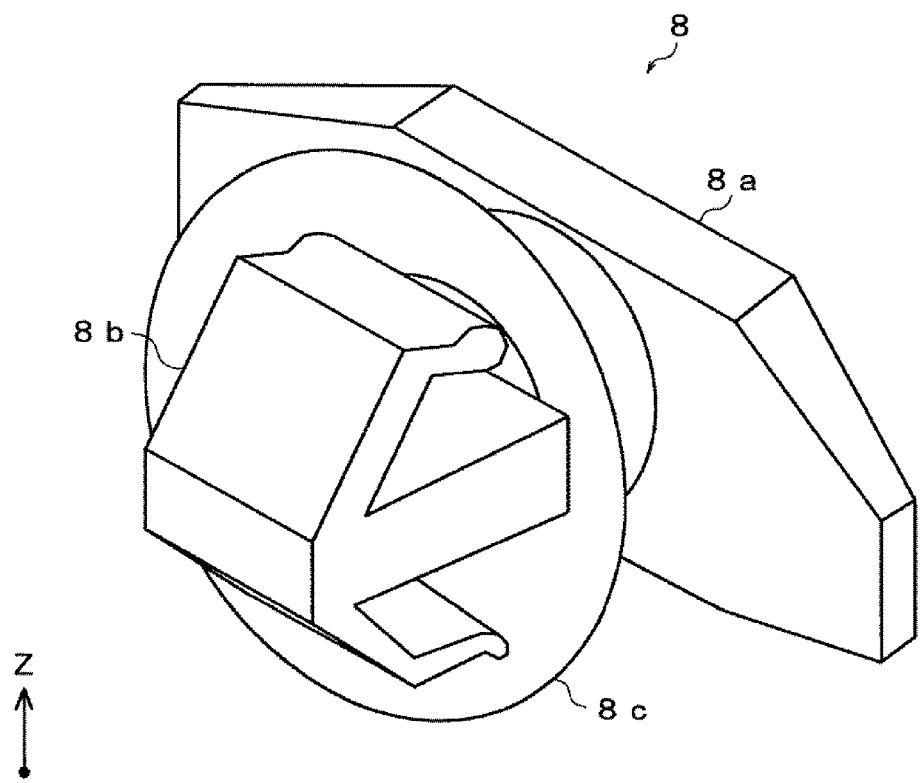
FIG. 5 is a schematic perspective view to explain a clip used in the embodiment of the invention.

The clip 8 is made of resin such as POM (polyacetal). The clip 8, as shown in FIG. 5, includes a holding projection 8a insertable into the part to be held 7d through the holes 7c of the gasket 7, an engagement part 8b engageable with holes 9b (to be discussed later) formed in the flange 9a, and a covering part 8c for covering the holes 9b when the engagement parts 8b are engaged with the holes 9b. The number of clips 8 is the same as the number of holes 7c.

The flange 9a is made of a thin iron plate. The flange 9a, as shown in FIG. 3, is divided into multiple parts. The flange 9a is erected in the Z direction over the whole periphery of the inner peripheral surface of the tray 5 situated inside the seal surface 5a. The flanges 9a, as shown in FIG. 4, are respectively fixed by spot welding to the vertical wall of the tray 5 situated inside the seal surface 5a to thereby form the flange part 9 extending in the Z direction. The Z-direction height of the respective flanges 9a is set for the height enabling proper holding of the gasket 7 between the seal surfaces 5a and 6a. The flange 9a has holes 9b into which the engagement parts 8b of the clips 8 can be fitted. The number of holes 9b is the same as the number of holes 7c, that is, the number of clips 8.

In the above structure, the holding projections 8a of the clips 8 are mounted on the parts to be held 7d of the gasket 7 and, in this state, the engagement parts 8b of the clips 8 are respectively engaged into the holes 9b of the flange part 9.

Then, before the cover 6 is assembled, the gasket 7 is fixed to the tray 5 through the clips 8 and flange part 9, and the leg parts 7a are contacted with the seal surface 5a and are slightly spread and displaced due to elastic deformation. In this state, the cover 6 is placed on the tray 5 and the gasket 7 is pressure contacted with the seal surfaces 5a, 6a in the Z direction, whereby, as shown in FIG. 4, the leg parts 7a are further spread and displaced and are tightly adhered to the seal surface 5a, and the hollow wall parts 7b, are collapsed and displaced due to elastic deformation and are tightly adhered to the seal surface 6a, as shown by solid lines from the state shown by two-dot chained lines. The displacement amounts of the hollow wall parts 7b in the Z direction are set such that, in assembling the cover 6 on the tray 5, it becomes larger than the displacement amounts of the leg parts 7a in the Z direction. Therefore, the gasket 7 can be easily held on the tray 5 and the gasket can be positively adhered to the seal surfaces 5a, 6a.

According to the above structure, since the gasket 7 includes the parts to be held 7d, which are to be held by the tray 5 through the clips 8 and flange part 9, at positions different from the seal surfaces 5a and 6a of the tray 5 and cover 6, a mounting hole for fixing the gasket need not be formed in the tray 6 or cover. This can positively prevent generation of rust from the periphery of the hole. Also, when the tray 5 and cover 6 are connected to each other, the leg parts 7a and hollow wall parts 7b of the gasket 7 are deformed. Therefore, the strength of adhesion of the gasket to the tray 5 and cover 6 can be controlled even without using a stepped bolt, thereby enabling cost reduction. Also, the parts to be held 7d serving as holding parts for holding the gasket 7 with respect to the tray 5 are situated more inward than the pressure contact portions between the seal surfaces 5a, 6a and gasket 7. This can positively prevent invasion of water droplets or the like into the battery pack 1 from the parts to be held 7d of the gasket 7.

Figure 6:
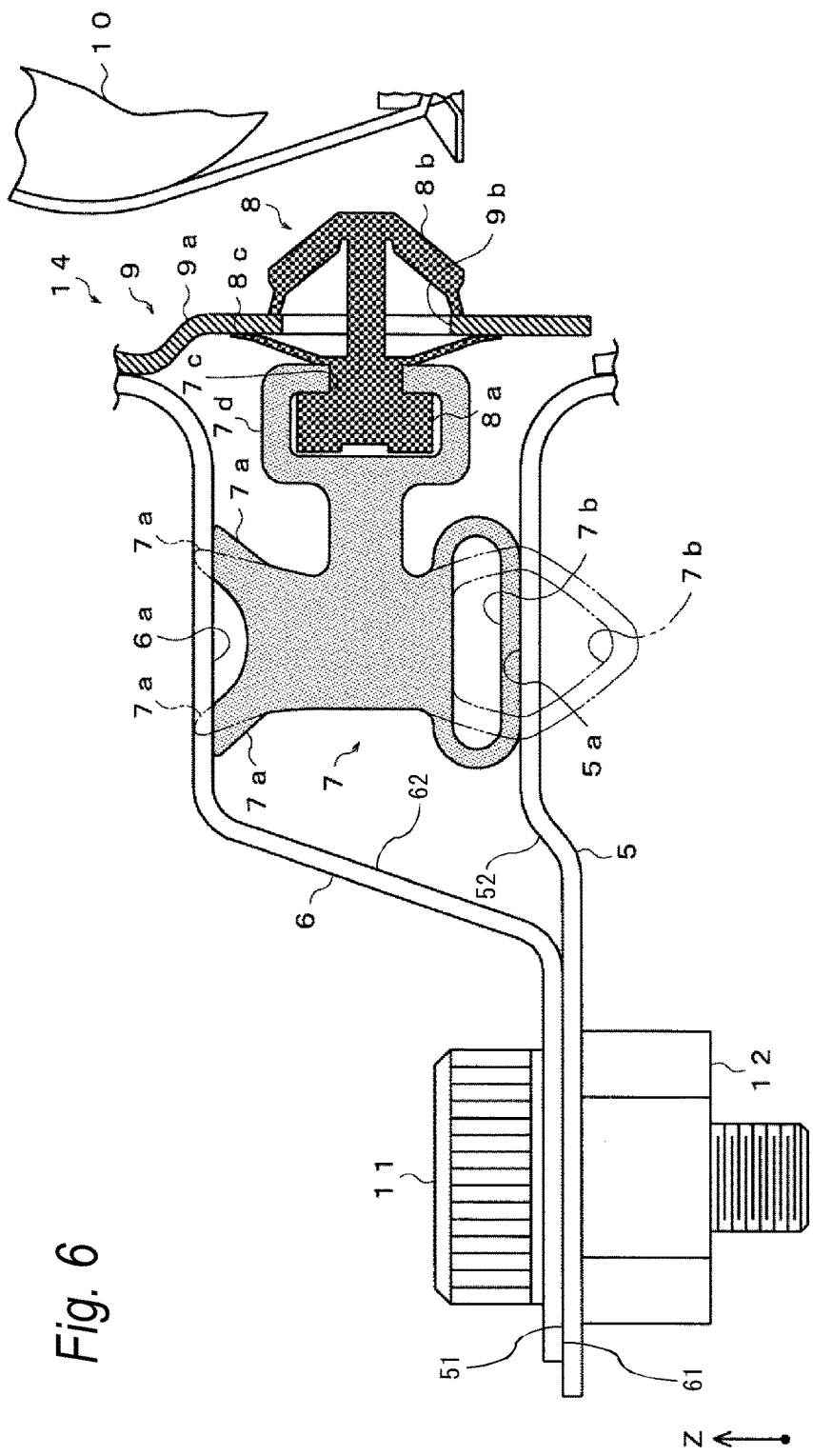
FIG. 6 is a schematic section view to explain a battery pack seal structure according to a modification of the embodiment of the invention.

FIG. 6 shows a battery pack seal structure 14 which is a modification of the battery pack seal structure 13 shown in FIG. 4. The battery pack seal structure 14 is different from the battery pack seal structure 13 in that the flanges 9a are respectively fixed by spot welding to the inside vertical wall of the seal surface 6a of the cover and the gasket 7 is turned upside down. In this modification, the holding projections 8a of the clips 8 are respectively mounted on the parts to be held 7d of the gasket 7 and, in this state, the engagement parts 8b of the clips 8 are engaged with the holes 9b respectively. Thus, the gasket 7 is fixed to the cover 6 through the clips 8 and flanges 9a, and leg parts 7a are slightly spread and displaced with respect to the seal surface 6a. In this state, the cover 6 is placed over the tray 5 and the gasket 7 is pressure contacted with the seal surfaces 5a and 6a in the Z direction, whereby the leg parts 7a are further spread, that is, displaced with respect to the seal surface 6a of the cover 6 into tight adhesion thereto, and the hollow wall parts 7b are collapsed, that is, displaced with respect to the seal surface 5a of the tray 5 into tight adhesion thereto. This modification can also provide similar operation effects as the above-mentioned embodiment.

As described above, according to the invention, it is not necessary to form in a tray or a cover a mounting hole for fixing a gasket and, when the tray and cover are connected to each other, the upper and lower parts of the gasket are deformed. Thus, while preventing or suppressing cost-up, the strength of adhesion of the gasket to the tray and cover can be controlled.

Although description has been given heretofore of the exemplified embodiments of the invention, the invention is not limited to the above specific embodiments but, unless specifically limited by the above description, various changes and modifications are possible without departing from the scope of the gist of the invention set forth in the claims. For example, the tray and cover may also be made of resin and the flange may be formed as an integral body instead of dividing it. Although the tray and cover may be made of resin, when cost and the abnormal heat generation and the like of the battery cell stored within the battery pack are taken into consideration, metal-made tray and cover may be preferred to resin-made tray and cover. For another example, the seal surface of the tray may be placed lower than the fastened surface of the tray in the Z-direction, and/or the seal surface of the cover may be place lower than the fastening surface of the cover in the Z-direction. The effects disclosed in the embodiments of the invention are enumeration of the most preferred effects provided by the invention and thus the effects of the invention are not limited to the effects disclosed in the embodiments of the invention.

What is claimed is:

1. A seal structure of a battery pack, comprising:
   a tray for storing a battery cell therein;
   a cover covering the tray;
   a gasket in pressure-contact with a seal surface of the tray and a seal surface of the cover, so as to close a clearance between the seal surfaces; and
   a flange part for holding the gasket, which is forming integrally with the tray or cover,
   wherein the gasket is held by the flange part at a position different from positions of the seal surfaces, and
   wherein the gasket includes a leg part contacting one of the seal surfaces and a hollow wall part defining a space therein and contacting the other of the seal surfaces.

2. The seal structure according to claim 1, further comprising:
   a clip connecting the gasket and flange part to each other.

3. The seal structure according to claim 2, wherein the gasket is held at a position existing within the battery pack more inward than pressure contact portions of the gasket with the seal surfaces.

4. The seal structure according to claim 1, wherein the gasket is held at a position existing within the battery pack more inward than pressure contact portions of the gasket with the seal surfaces.

5. The seal structure according to claim 1, wherein a displacement amount of the hollow wall part is larger than a displacement amount of the leg part in a state that the gasket is pressure contacted with the seal surfaces.

6. The seal structure according to claim 5, wherein the leg part is pressure contacted with one of the seal surfaces of the tray and cover which holds the gasket, and
the hollow wall part is pressure contacted with the other of the seal surfaces different from the one of the seal surfaces.

* * * * *